Patented May 13, 1941

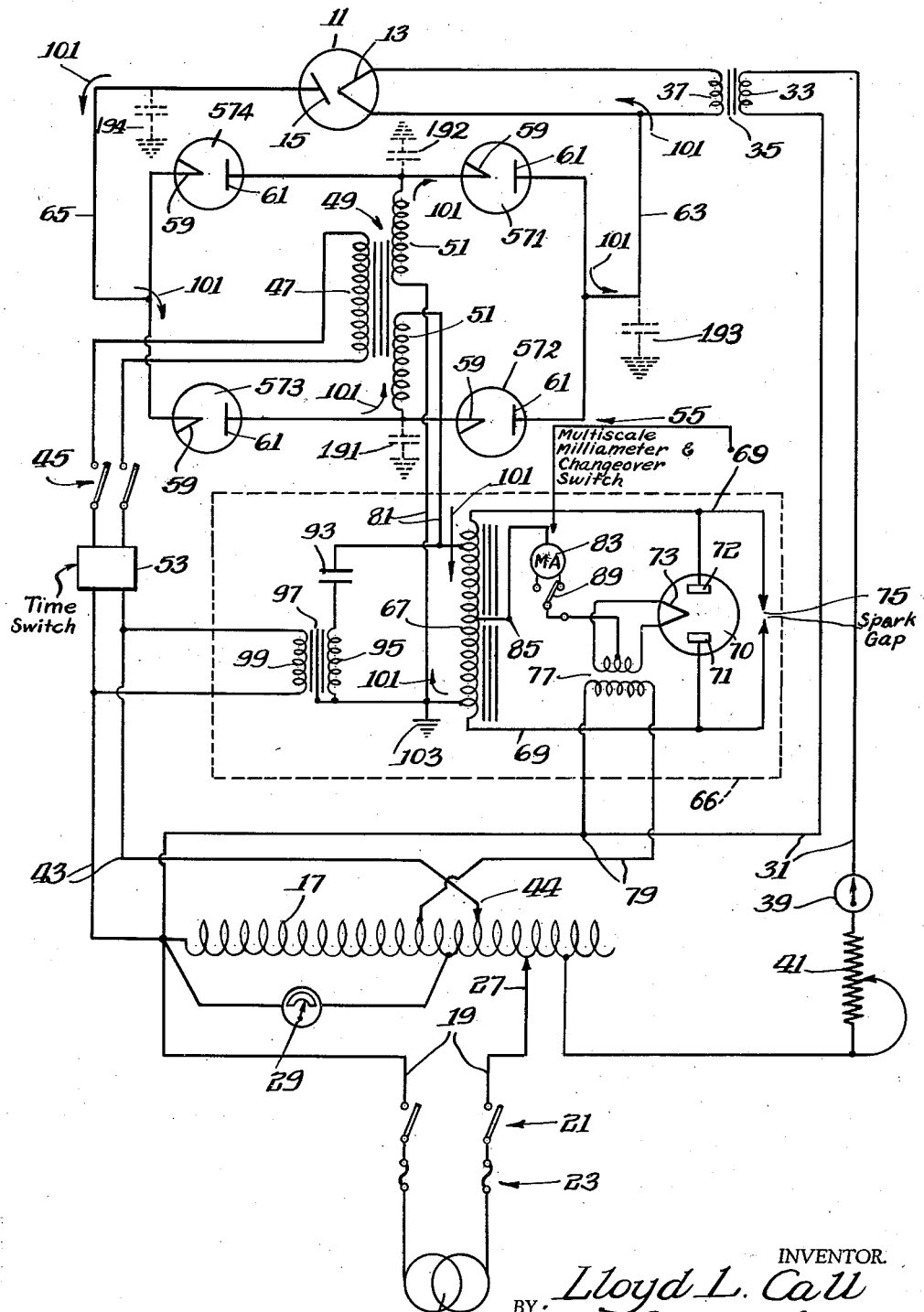

2,242,107

UNITED STATES PATENT OFFICE 2,242,107

METERING SYSTEM

Lloyd L. Call, Glen Ellyn, Ill., assignor to General Electric X-Ray Corporation, Chicago, Ill., a corporation of New York Application August 27, 1938, Serial No. 227,127

4 Claims. (Cl. 171—95)

My invention relates in general to metering and has more particular reference to means for accurately and dependably metering electrical current in X-ray tubes at a remote control station during tube operation from full wave rectifiers.

An important object of the present invention is to provide metering means of the character mentioned wherein the current indication is accomplished at a station remote from the device in which the current being metered is established, while avoiding the use of high voltage conductors connected between such device and the remote station at which the current indication takes place, the invention particularly envisaging shock-proof equipment of the character mentioned.

Another important object is to provide metering equipment of the character mentioned wherein current indicating devices are located at a station remote from the X-ray equipment in which the current being measured is established, such, for instance, as a station at which are located controls for the equipment, whereby the indicating devices or meters utilized may be conveniently grouped immediately adjacent the control devices under the critical inspection of an operator manipulating the same.

Another important object is to provide for metering current in X-ray tubes by compensating for the charging current component of current supplied to the tube whereby to eliminate the error spuriously imparted to the indicating device as a result of the charging current component which leads the actual load component of current by ninety degrees.

Another important object is to provide for metering load current in X-ray tubes by means having a uniformly graduated scale indicator, to thereby facilitate the accurate determination of currents having relatively small magnitude.

Another important object is to provide for metering, more particularly electrical load current in X-ray tubes, by utilizing a vacuum tube, bridge-connected rectifier, in conjunction with a suitable indicating device, including means whereby any failure of said rectifier may be indicated, to the end that the operator of the equipment at no time can be misled by faults that may develop in the metering equipment, and which may lead the operator to destroy or irreparably injure the equipment before the failure is discovered.

These and other numerous important objects, advantages and inherent functions of the invention will become apparent as the same is more fully understood from the following description which, taken in conjunction with the accompanying drawing, discloses a preferred embodiment of the present invention.

Referring to the drawing, the single figure comprises a diagrammatic representation of an X-ray tube and a metering equipment for measuring current therein, in accordance with the present invention.

To illustrate my invention, I have shown on the drawing an X-ray tube 11 which, of course, may be of any suitable or preferred form, having a cathode 13 including a filament, and an anode or target 15. The tube 11 is energized from an auto-transformer 17 which is connected as shown by means of the conductors 19, the control switch 21, and overload protection devices 23, with a source 25 of alternating electrical power. One of the conductors 19 is preferably connected at an end of the autotransformer 17, the other conductor being adjustably connected with the autotransformer by means of the variable connection 27. The voltage thus applied to the autotransformer may be determined by means of the volt-meter 29 suitably connected with spaced points on the autotransformer 17.

Current for exciting the tube filament 13 is supplied from the autotransformer through conductors 31, one of which is connected preferably at one end of the autotransformer, and the other of which is connected at or adjacent the remote end of the autotransformer, to form a circuit including the primary winding 33 of a transformer 35, the secondary winding 37 of which is interconnected with the filament 13, and the circuit, including the conductors 31 and the primary winding 33, also preferably includes a filament current indicating meter 39 and an adjustable current regulating device 41.

Anode current is supplied to the tube 11 from the autotransformer 17 by means of conductors 43, one of which is connected preferably at one end of the autotransformer, the other being connected on said autotransformer adjustably, as by means of the adjustable connection 44, and the conductors 43 are connected, through a suitable manually operable time controlled safety switch mechanism 45 and 53, with the primary winding 47 of a stepup transformer 49 preferably having a split plurality of secondary windings 51. One or other or both of the conductors 43 forming the primary circuit of the step-up transformer 49 may be provided with a suitable timing switch 53 which may be adjusted to determine the length of time during which anode current is applied to the tube, as, for example, in operating the tube for radiographic purposes.

The secondary windings 51 of the transformer 49 are interconnected with a rectifying system 55 and with self-compensating metering equipment 66 embodying my present invention. The rectifying system 55, as shown in the illustrated embodiment, comprises four electron valves 571, 572, 573, and 574, each having a cathode 59 and an anode 61, although it will be obvious, as the invention is more fully understood, that any suitable rectification system, including mechanical rectifiers or full wave, high voltage testing or precipitator rectifiers, may be employed.

The metering system of the present invention also is not necessarily restricted to full wave rectifiers, although it has its greatest advantage when operating in connection with full wave rectification. One side of the rectifying system 55 is connected as by the conductor 63 with the filament of the tube 11, while the other side is connected as by means of the conductor 65 with the tube anode 15.

The self-compensating metering system 66 embodies an autotransformer 67 comprising a coil, the opposite ends of which are connected by means of the conductors 69, respectively, with the plates 71 and 72 of a small, double-plate, thermionic rectifying valve 70 having a filament 73. The conductors 69 are also connected with a spark gap 75 to afford protection for the metering device against fault conditions of the rectifier system 55 that may produce excessively high voltage conditions in the coil 67.

The filament 73 of the double-plate, thermionic rectifying valve is interconnected with the secondary winding of a filament transformer 77, the primary winding of which is interconnected with the autotransformer 17 by means of the conductors 79 for the purpose of energizing the filament transformer.

The winding 67 is connected at points preferably equally spaced from the opposite ends thereof by means of conductors 81, each with an end of one of the secondary windings 51 of the step-up transformer 49, the opposite ends of said windings 51 being connected with the four valve rectifying system 55.

In order to measure the current delivered through said secondary windings 51 to the rectifying system and thence to the tube 11, I provide a meter 83 preferably comprising any suitable accurate direct current milliammeter, one side of which is connected, as by the conductor 85, with the mid point of the transformer winding 67. The meter 83 is provided with a scale changing switch 89 through which it is connected with the mid point of the secondary winding of the filament transformer 77.

The meter 83 preferably comprises a direct current milliammeter because such meters have uniform scale graduations, that is to say, a unit deflection of the meter indicates the same current variation at all points within the scale range of the meter, as distinguished from the non-linear scale of alternating current milliammeters, in which unit deflection in any portion of the scale represents a different current variation than the same deflection at another point in the scale, thereby rendering alternating current meters difficultly readable. When full wave rectification is employed, the current through the secondary coils 51 of the step-up transformer is alternating in character, as distinguished from pulsating unidirectional current, and consequently, the direct current ammeter will respond to the rectified charging current component of the rectifier system and load which leads the load component by ninety degrees and which is delivered therewith through the transformer 49 and the rectifying system 55 in order to accommodate the capacity relationship which exists between ground and the conductors connecting the rectifier valves 571, 572, 573 and 574, as well as between ground and the conductors 63 and 65, said capacity relationship being indicated on the drawing in dotted lines at 191, 192, 193, and 194.

In order to compensate for the spurious error imparted to the meter 83 under the influence of the charging current component of the rectifier system and load, I interconnect a condenser 93 in circuit with the secondary winding 95 of a current transformer 97, the primary winding 99 of which is connected with the conductors 43 and hence with the autotransformer 17, the transformer 97 thus being powered from exactly the same source from which power is delivered to the step-up transformer 49, and thence to the tube 11. The condenser and secondary winding 95 are connected with the conductors 81 and hence are connected with the winding 67 with which the indicating meter 83 is attached in parallel relationship with respect to the windings 51.

The condenser 93, in conjunction with the transformer 97, is selected as to the electrical characteristics of the combination to apply upon the winding 67, through the transformer 97, a current at all times exactly equal to and opposite the charging current component of the rectifier system and load that is applied upon the winding 67 through the transformer 49, so that the charging current may be cancelled and the meter 83 be affected only by the load component of current delivered by the transformer and rectifying system 55 to the lamp 11.

In operation, the setting of the selector 44 determines the voltage impressed upon the primary winding of the step-up transformer 49. The voltage induced in the secondary windings 51 produces an electron flow through the rectifier valves 571, 572, 573 and 574 and the X-ray tube, as indicated by the arrows 101, during the positive portion of the alternating current wave. These electrons travel from the ground connection 103 through the uppermost winding 51 of the transformer 49 and the rectifier valve 571 at the upper right-hand corner of the system 55, as illustrated, thence through the tube 11 from filament to plate, through the lower rectifier valve 573 at the lower left corner of the system 55, and thence through the lower winding 51 of the transformer 49, as illustrated, and thence through the winding 67 to the ground connection 103.

The normal electron stream made effective at the winding 67 is a resultant of two streams. One of these is due to the load electron stream which flows from filament to anode of the X-ray lamp, and the other component is due to the charging current component which leads the load component by ninety electrical degrees, as a result of the capacity relationships which exist between the high voltage conductors and the grounded tank in which the same are enclosed, said relationships being shown diagrammatically at 191, 192, 193 and 194 on the drawing.

The load component of the electron stream is delivered through the winding 67. The plate 71 of the double-plate rectifier tube, which is connected with the grounded end of the winding 67, is then positive with respect to its filament, and electron flow through the conductor 85, the meter 83, and the switch 89, is due to the potential of the self-induced voltage of the current transformer. The capacity component of the electron stream, which is a function of the characteristic of the rectifier end of the cables and of the shape of the voltage supplied through the autotransformer, tends to produce self-induced voltage in the current transformer that is cancelled out by the voltage induced in the secondary winding 95 of the compensating circuit, including said secondary winding 95 and the condenser 93. The primary of the compensating transformer 97 is connected to the load side of the autotransformer 17 in such a manner that the compensating voltage is one hundred and eighty degrees out of phase, or in phase opposition to the self-induced voltage due to the charging electron stream of the system.

On the alternate half cycle or negative portion of the alternating current wave, the electron stream flows through the other two valves 572 and 574, that is to say, the valves at the upper left and lower right-hand corners of the system 55, as shown in the drawing, and in a direction in the secondary windings 51 and in the winding 67 opposite to that indicated by the arrows 101, and the electron stream flows to the plate 72 of the meter rectifier 70. Likewise, during negative alternate half cycles, the compensating potential is reversed in the transformer 97 so that it remains in opposition to the self-induced voltage due to the charging current component.

It will be seen that the metering system of my present invention precludes the necessity of bringing high-tension cables to the indicator 83, which consequently may safely be mounted in the control panel without danger of shocking the observer. The meter thus may conveniently be mounted on the control panel directly in view of the operator. The system enables the meter to be provided with a uniformly graduated scale to facilitate reading thereof.

In addition, the system eliminates the necessity of utilizing copper oxide or other relatively inaccurate devices, and at the same time avoids the danger of damage to the equipment due to failure of one of the rectifiers 571, 572, 573, and 574, since in that event the protective gap 75 prevents the voltage in the meter circuit from rising to excessive values.

Among the other advantages of the present system is that the average current indicated by the meter 83 is directly proportional to the load component of current passing the X-ray tube 11; and the compensating circuit, including the transformer 97 and condenser 93, effectively neutralizes the charging current component for all load values. Furthermore, one or more meters 83 may be connected in series upon the same rectifying system; and multiple scale meters may be used, if desired. In the event that the filament circuit of the meter rectifying tube 70 burns out or a connection is broken, the meter immediately indicates zero, showing the operator that his metering system or the rectifier is faulty.

It is thought that the invention and numerous of its attendant advantages will be understood from the foregoing description, and it is obvious that numerous changes may be made in the form, construction and arrangement of the several parts without departing from the spirit or scope of the invention, or sacrificing any of its attendant advantages, the form herein described being a preferred embodiment for the purpose of illustrating the invention.

The invention is hereby claimed as follows:

1. In a metering system, for indicating the alternating current load in an electrical device having reactive characteristics requiring a charging current component and adapted to be energized from a suitable power source, comprising a direct current indicating meter, means for applying, on said meter, power at all times proportional to a fluctuating load current comprising a circuit including transformer means, rectifier means associated with said transformer means for actuating the meter from the transformer means, means for applying on said transformer means an electrical impulse proportional to the load component and the charging component, and means adapted to be energized from said power source including capacity reactance for applying on said transformer means an electrical impulse at all times equal and opposite to said charging component whereby the meter actuating impulse transferred from said transformer means indicates only the value of said load component.

2. A metering system for indicating the alternating current load in an electrical device having reactive characteristics requiring a charging current component comprising, in combination with power delivery means for said device, a direct current indicating meter, means comprising an auto-transformer connected with said power delivery means to receive therefrom load and charging components corresponding with the load and charging components of energy delivered to said device, rectifier means for applying, on said meter, unidirectional power proportional to the load component applied on said auto-transformer, said rectifier means comprising a multiple plate rectifying valve, means forming a protective gap connected in parallel relationship with respect to a pair of the plates of said rectifying valve, and means for applying, differentially on said auto-transformer, power at all times equal to the charging component, whereby to cancel the charging component so that the meter may indicate only the amount of said load component.

3. A metering system for indicating the alternating current load in an electrical device having reactive characteristics requiring a charging current component comprising, in combination with power delivery means for said device, a direct current indicating meter, means comprising an auto-transformer connected with said power delivery means to receive therefrom load and charging components corresponding with the load and charging components of energy delivered to said device, means for applying on said meter unidirectional power proportional to the load component applied on said auto-transformer, and circuit means for applying, differentially on said auto-transformer, power at all times equal to the charging component delivered on said auto-transformer with the load component, said circuit means comprising the secondary winding of a transformer and fixed condenser means, said transformer having a primary winding powered from said power delivery means in parallel relationship with respect to the electrical device.

4. A metering system for indicating the alternating current load in an electrical device having reactive characteristics requiring a charging current component comprising, in combination with power delivery means for said device, a direct current indicating meter, means comprising an auto-transformer connected with said power delivery means to receive therefrom load and charging components corresponding with the load and charging components of energy delivered to said device, means for applying on said meter unidirectional power proportional to the load component applied on said auto-transformer, and circuit means for applying, differentially on said auto-transformer, power at all times equal to the charging component delivered on said auto-transformer with the load component, said circuit means comprising the secondary winding of a transformer and fixed condenser means, said transformer having a primary winding powered from said power delivery means in parallel relationship with respect to the electrical device, said electrical device being powered through a transformer, the primary winding of which is connected with said power delivery means and the secondary winding of which is connected with the electrical device, through rectifiers, and with said auto-transformer from which the meter is energized.

LLOYD L. CALL.